(12) United States Patent
Bobaru

(10) Patent No.: US 10,829,195 B2
(45) Date of Patent: Nov. 10, 2020

(54) BULKHEAD ASSEMBLY WITH POCKET DOOR FOR AIRCRAFT INTERIOR

(71) Applicant: BOMBARDIER INC., Dorval (CA)

(72) Inventor: Constantin Bobaru, Laval (CA)

(73) Assignee: BOMBARDIER INC., Dorval (CA)

( * ) Notice: Subject to any disclaimer, the term of this patent is extended or adjusted under 35 U.S.C. 154(b) by 567 days.

(21) Appl. No.: 15/310,314

(22) PCT Filed: May 6, 2015

(86) PCT No.: PCT/IB2015/053312
§ 371 (c)(1),
(2) Date: Nov. 10, 2016

(87) PCT Pub. No.: WO2015/173694
PCT Pub. Date: Nov. 19, 2015

(65) Prior Publication Data
US 2017/0274975 A1    Sep. 28, 2017

Related U.S. Application Data

(60) Provisional application No. 61/991,672, filed on May 12, 2014.

(51) Int. Cl.
*B64C 1/14*    (2006.01)
*B64D 11/00*    (2006.01)
*B64C 1/10*    (2006.01)

(52) U.S. Cl.
CPC .............. *B64C 1/1461* (2013.01); *B64C 1/10* (2013.01); *B64C 1/1469* (2013.01); *B64D 11/0023* (2013.01); *Y02T 50/46* (2013.01)

(58) Field of Classification Search
CPC ..... B64D 11/0023; B64C 1/10; B64C 1/1423; B64C 1/1461; B64C 1/1469; B64C 1/1438; E06B 3/4654; Y02T 50/46
See application file for complete search history.

(56) References Cited

U.S. PATENT DOCUMENTS 2,842,808 A * 7/1958 Kuhnke ................ E06B 3/4654
49/372
2,857,629 A * 10/1958 Walter ................ E06B 3/4654
49/372

(Continued)

FOREIGN PATENT DOCUMENTS

CN    1212937 A    4/1999
CN    202100170 U    1/2012
(Continued)

OTHER PUBLICATIONS

The State Intellectual Property Office of the People'S Republic of China, Notification of First Office Action dated Jun. 27, 2018 re: application No. 201580024716.8.
(Continued)

*Primary Examiner* — Medhat Badawi
(74) *Attorney, Agent, or Firm* — Norton Rose Fulbright Canada LLP

(57) ABSTRACT

The present disclosure describes a bulkhead assembly for an aircraft interior comprising a pocket door mechanism (48) for supporting and guiding the movement of a pocket door; and a structural member (50) to which the pocket door mechanism is attached. The structural member is attached to a structure of the aircraft and provides support for the pocket door relative to the aircraft structure independently of any decorative member (32, 34) covering the structural member.

17 Claims, 11 Drawing Sheets

(56) References Cited

U.S. PATENT DOCUMENTS

| | | | | |
|---|---|---|---|---|
| 4,185,799 A * | 1/1980 | Richards, Jr. | ............ | B64C 1/20 244/118.5 |
| 4,325,204 A * | 4/1982 | Martine | ................ | E06B 3/4654 49/372 |
| 4,911,219 A * | 3/1990 | Dalrymple | ............ | B61D 17/20 160/118 |
| 4,989,808 A * | 2/1991 | Spraggins | ............ | B64C 1/1407 244/118.5 |
| 5,605,016 A * | 2/1997 | Pollard | ............... | E05D 15/0652 49/506 |
| 5,904,318 A * | 5/1999 | Towfiq | ..................... | B64C 1/40 244/1 N |
| 6,186,444 B1 * | 2/2001 | Steel | .................... | B64C 1/1423 160/118 |
| 6,823,927 B2 * | 11/2004 | Steel | ....................... | E05D 3/022 16/49 |
| 8,038,100 B2 * | 10/2011 | Osborne | ............ | B64D 11/0023 244/129.5 |
| 10,577,072 B2 * | 3/2020 | Herau | ................... | B64C 1/1415 |
| 2002/0171260 A1 * | 11/2002 | Schneider | .............. | B60J 5/0418 296/146.6 |
| 2003/0019976 A1 * | 1/2003 | Cheung | .................. | B64D 11/00 244/118.5 |
| 2004/0148865 A1 * | 8/2004 | Duncan | ................. | E05B 1/0015 49/415 |
| 2004/0173327 A1 * | 9/2004 | Steel | ....................... | E05D 3/022 160/210 |
| 2005/0067870 A1 * | 3/2005 | Rezag | .................... | B64D 11/06 297/354.13 |
| 2005/0133557 A1 * | 6/2005 | McKenzie | .............. | B60R 11/00 224/547 |
| 2006/0091257 A1 * | 5/2006 | Melberg | ................ | B64D 11/00 244/118.5 |
| 2006/0145007 A1 * | 7/2006 | Melberg | ................ | B64C 1/1469 244/118.5 |
| 2006/0230684 A1 * | 10/2006 | Poole | .................. | E05D 15/0634 49/409 |
| 2007/0034742 A1 * | 2/2007 | Jaeger | ..................... | B64D 11/00 244/118.6 |
| 2012/0060271 A1 * | 3/2012 | Dannenberg | ........... | B64D 11/02 4/321 |
| 2012/0255232 A1 * | 10/2012 | Gayhart | .............. | E05B 65/0017 49/360 |
| 2013/0160464 A1 * | 6/2013 | Maszczk | ................. | B60R 16/00 60/796 |
| 2013/0318873 A1 * | 12/2013 | Knijnenburg | ......... | B64C 1/1407 49/31 |
| 2014/0075863 A1 * | 3/2014 | Laronde | ................... | E06B 1/045 52/217 |
| 2014/0117161 A1 * | 5/2014 | Harter | ................. | B64D 11/0023 244/129.5 |
| 2015/0108275 A1 * | 4/2015 | Pothier | ................... | E05B 77/36 244/129.5 |
| 2015/0210373 A1 * | 7/2015 | Guimont | ................ | B64C 1/1469 244/129.5 |
| 2015/0217860 A1 * | 8/2015 | Yang | ....................... | B64C 25/04 244/102 R |
| 2016/0144944 A1 * | 5/2016 | Goings | ............... | B64D 11/0023 244/129.5 |
| 2016/0298370 A1 * | 10/2016 | Druckman | ......... | B64D 11/0606 |
| 2017/0274975 A1 * | 9/2017 | Bobaru | ................. | B64C 1/1469 |

FOREIGN PATENT DOCUMENTS

| | | |
|---|---|---|
| DE | 10155820 A1 | 6/2003 |
| EP | 2540616 A2 | 1/2013 |
| EP | 2540617 A2 | 1/2013 |
| WO | 2014027215 A1 | 2/2014 |
| WO | 2014070353 A1 | 5/2014 |

OTHER PUBLICATIONS

English translation of China patent document No. CN1212937A dated Apr. 7, 1999, https://patents.google.com/patent/CN1212937A/en?oq=CN1212937+(A)+, accessed on Aug. 13, 2018.

English translation of China patent document No. CN202100170 dated Jan. 4, 2012, https://patents.google.com/patent/CN202100170U/en?oq=CN202100170U, accessed on Aug. 13, 2018.

English translation of German patent document No. DE10155820 dated Jun. 5, 2003, https://patents.google.com/patent/DE10155820A1/en?oq=DE10155820, accessed on Aug. 13, 2018.

PCT international Search Report and Written Opinion dated Aug. 5, 2015 re: International Application No. PCT/IB2015/053312.

English translation of EP patent document number No. EP2540616 dated Jan. 2, 2013; www.google.com/patents . . . .

English translation of EP patent document number No. EP2540617 dated Jan. 2, 2013; www.google.com/patents . . . .

* cited by examiner

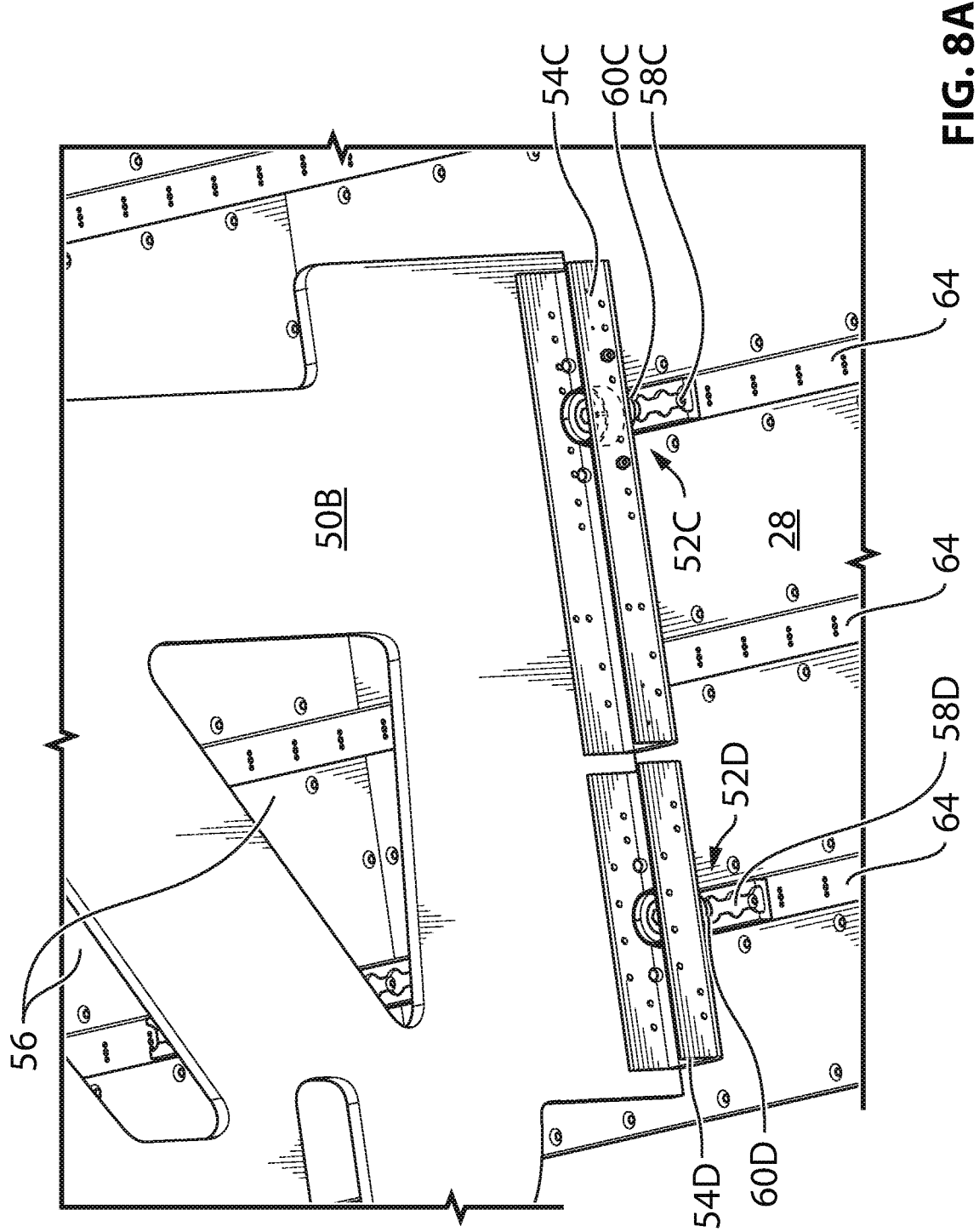

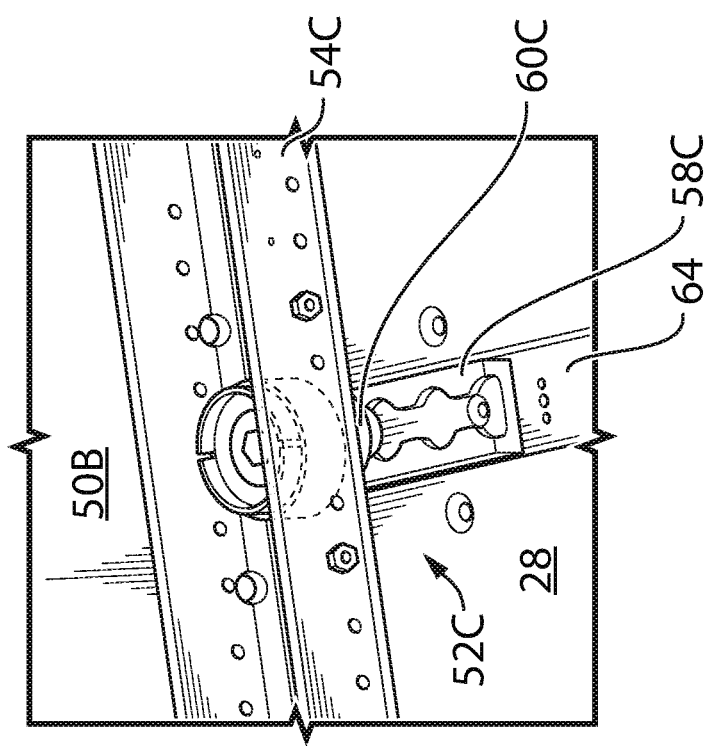

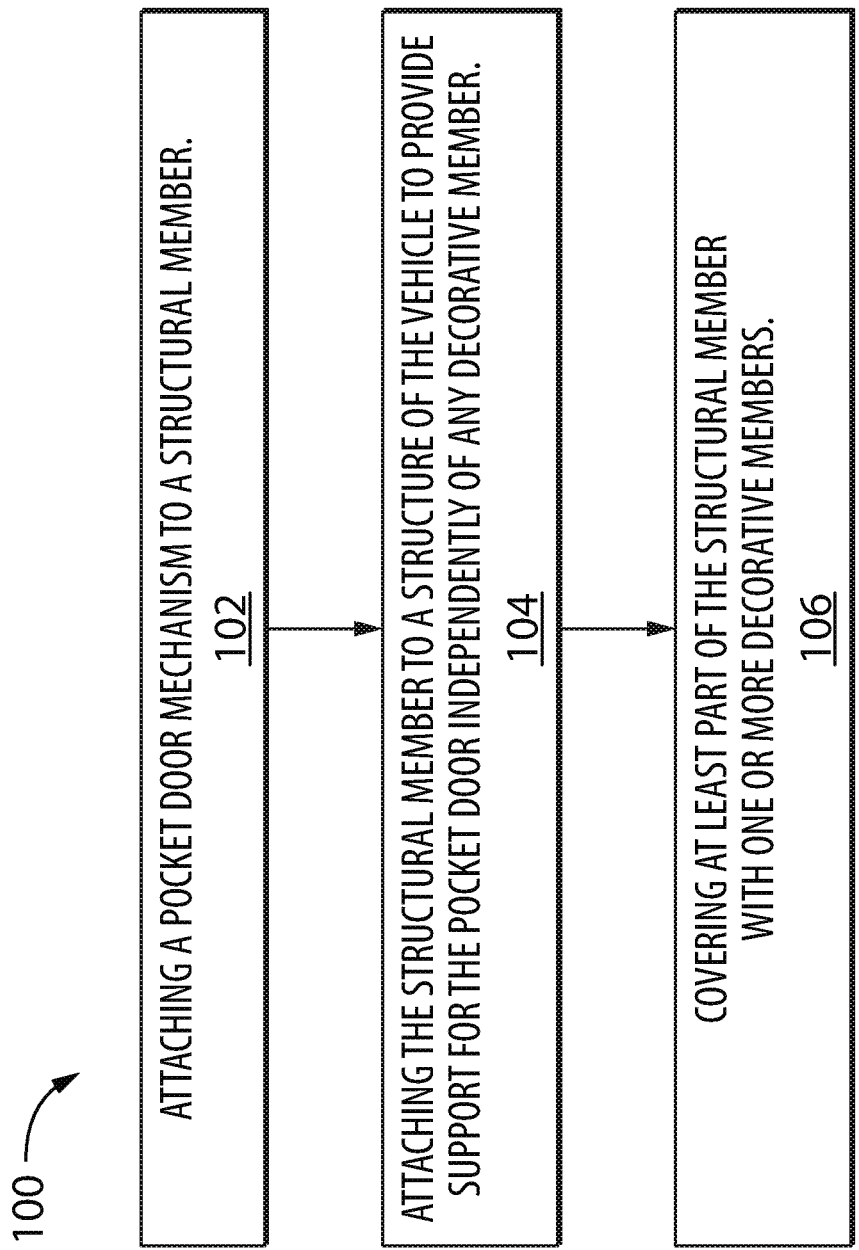

BULKHEAD ASSEMBLY WITH POCKET DOOR FOR AIRCRAFT INTERIOR

CROSS-REFERENCE TO RELATED APPLICATION(S)

This application is a national phase application under 35 U.S.C. 371 of International Patent Application No. PCT/IB2015/053312 filed on May 6, 2015, which claims priority from U.S. Provisional Patent Application Ser. No. 61/991,672, filed on May 12, 2014, the entire content of which is incorporated herein by reference.

TECHNICAL FIELD

The disclosure relates generally to doors for vehicle interiors, and more particularly to pocket door assemblies for vehicle interiors and related methods of installation.

BACKGROUND OF THE ART

Aircraft interiors, especially those of corporate aircraft, are often designed to fit the needs of individual buyers. Such aircraft interiors can comprise doors for opening or closing passages between zones of the aircraft interior. It is often preferred to use doors which slide into pockets (i.e., pocket doors) in a bulkhead because such doors can be more aesthetically pleasing and make better use of space constraints. A pocket door can comprise one or two segments which slide(s) horizontally in a sliding plane perpendicular to the floor of the aircraft interior and move(s) laterally to open or close the passages between the zones within the aircraft interior. When the pocket door is in an open position, the door segment(s) is/are recessed into the bulkhead pockets and occupants can pass through the passage.

Such pocket doors can have relatively complex mechanisms that support and guide the movement of the pocket doors. Some pocket door mechanisms are also configured to permit positional adjustment of the pocket door relative to adjacent structure. The complexity of existing pocket door mechanisms and also the need for making adjustments can result in labour-intensive and time-consuming installation procedures for pocket doors in vehicles. Improvement is therefore desirable.

SUMMARY

The disclosure describes components, assemblies and methods relating to doors for vehicle interiors.

In one aspect, the disclosure describes a bulkhead assembly for an aircraft interior. The assembly comprises:
 a pocket door mechanism for supporting and guiding the movement of a pocket door; and
 a structural member to which the pocket door mechanism is attached, the structural member being attached to a structure of the aircraft and being at least partially covered by a first decorative member, the structural member providing support for the pocket door relative to the aircraft structure independently of the first or any other decorative member at least partially covering the structural member.

In some embodiments, the structural member may comprise a cage structure at least partially enclosing the pocket door mechanism. The structural member may be configured to at least partially receive the pocket door therein when the pocket door is in an open position.

In some embodiments, the cage structure may comprise a box like enclosure.

In some embodiments, the cage structure may comprise a first panel.

In some embodiments, the cage structure may comprise a second panel spaced apart from the first panel.

In some embodiments, the first decorative member may be attached to the structural member.

In some embodiments, the structural member may comprise a first panel and a second panel spaced apart from the first panel. The pocket door mechanism may be disposed between the first panel and the second panel. The first panel and the second panel may be attached together via a bracket. The structural member may be attached to the aircraft structure via the bracket. The first panel and the second panel may be substantially parallel.

In some embodiments, the first decorative member may be attached to the first panel and a second decorative member may be attached to the second panel. The pocket door mechanism may be entirely attached to only one of the first panel and the second panel.

In some embodiments, the structural member may be attached to a fuselage of the aircraft via a first connection and to a floor of the aircraft interior via a second connection. At least one of the first connection and the second connection may be configured to provide positional adjustment of the structural member relative to the aircraft structure.

In another aspect, the disclosure describes an assembly for a bulkhead comprising a pocket door in a vehicle interior. The assembly comprises:
 a pocket door mechanism for supporting and guiding the movement of the pocket door; and
 a structural member to which the pocket door mechanism is attached, the structural member being configured to be:
  attached to a structure of the vehicle;
  at least partially covered by a first decorative member; and
  provide support for the pocket door relative to the vehicle structure independently of the first or any other decorative member at least partially covering the structural member.

In some embodiments, the structural member may comprise a cage structure at least partially enclosing the pocket door mechanism. The structural member may be configured to at least partially receive the pocket door therein when the pocket door is in an open position.

In some embodiments, the structural member may be configured to permit attachment of the first decorative member thereto.

In some embodiments, the structural member may comprise a first panel and a second panel spaced apart from the first panel. The pocket door mechanism may be disposed between the first panel and the second panel. The first panel and the second panel may be attached together via a bracket. The bracket may be configured to permit attachment of the structural member to the vehicle structure. The first panel and the second panel may be substantially parallel.

In some embodiments, the first panel may be configured to permit attachment of the first decorative member thereto and the second panel may be configured to permit attachment of a second decorative member thereto.

In some embodiments, the pocket door mechanism may be entirely attached to only one of the first panel and the second panel.

In some embodiments, the assembly may comprise first and second connections for attaching respective first and second portions of the structural member to the vehicle structure. At least one of the first connection and the second connection may be configured to provide positional adjustment of the structural member relative to the vehicle structure.

In some embodiments, the pocket door may be attached to the pocket door mechanism.

In another aspect, the disclosure describes aircraft comprising any one of the assemblies described herein.

In another aspect, the disclosure describes a method for installing part of a bulkhead comprising a pocket door in a vehicle interior. The method may comprise:

attaching a pocket door mechanism for the pocket door to a structural member;

attaching the structural member to a structure of the vehicle to provide support for the pocket door independently of any decorative member at least partially covering the structural member; and after attaching the structural member to the structure of the vehicle, covering at least part of the structural member with the decorative member.

In some embodiments, the method may comprise attaching the pocket door to the pocket door mechanism before attaching the structural member to the structure of the vehicle.

In some embodiments, the method may comprise adjusting the door mechanism before attaching the structural member to the structure of the vehicle.

In some embodiments, the structure of the vehicle may comprise a fuselage of an aircraft. The structure of the vehicle may instead or in addition comprise a floor of an aircraft interior.

In some embodiments, the method may comprise attaching the decorative member to the structural member.

Further details of these and other aspects of the subject matter of this application will be apparent from the detailed description and drawings included below.

DESCRIPTION OF THE DRAWINGS

Reference is now made to the accompanying drawings, in which:

FIG. 8A is an axonometric view of a lower portion of the panel of FIG. 6 attached to a floor of the aircraft of FIG. 1;

FIG. 8B is an enlarged axonometric view of a connection between the panel of FIG. 6 and a floor of the aircraft of FIG. 1;

FIG. 10 is a flowchart illustrating a method for installing part of a bulkhead comprising a pocket door in a vehicle interior.

DETAILED DESCRIPTION

Aspects of various embodiments are described through reference to the drawings.

The present disclosure describes components, assemblies and methods relating to doors for vehicle interiors. In various embodiments, the doors may comprise pocket doors that slide into cavities inside bulkheads of vehicle interiors. In some embodiments, the components, assemblies and methods disclosed herein may facilitate the installation of pocket doors in vehicle interiors. Even though examples provided in the present disclosure may be specific to aircraft, various aspects of the present disclosure may also be suitable for other types of vehicles (i.e., mobile platforms) such as, for example, busses, trains, spacecraft and watercraft (e.g., boats, ships).

Figure 1:
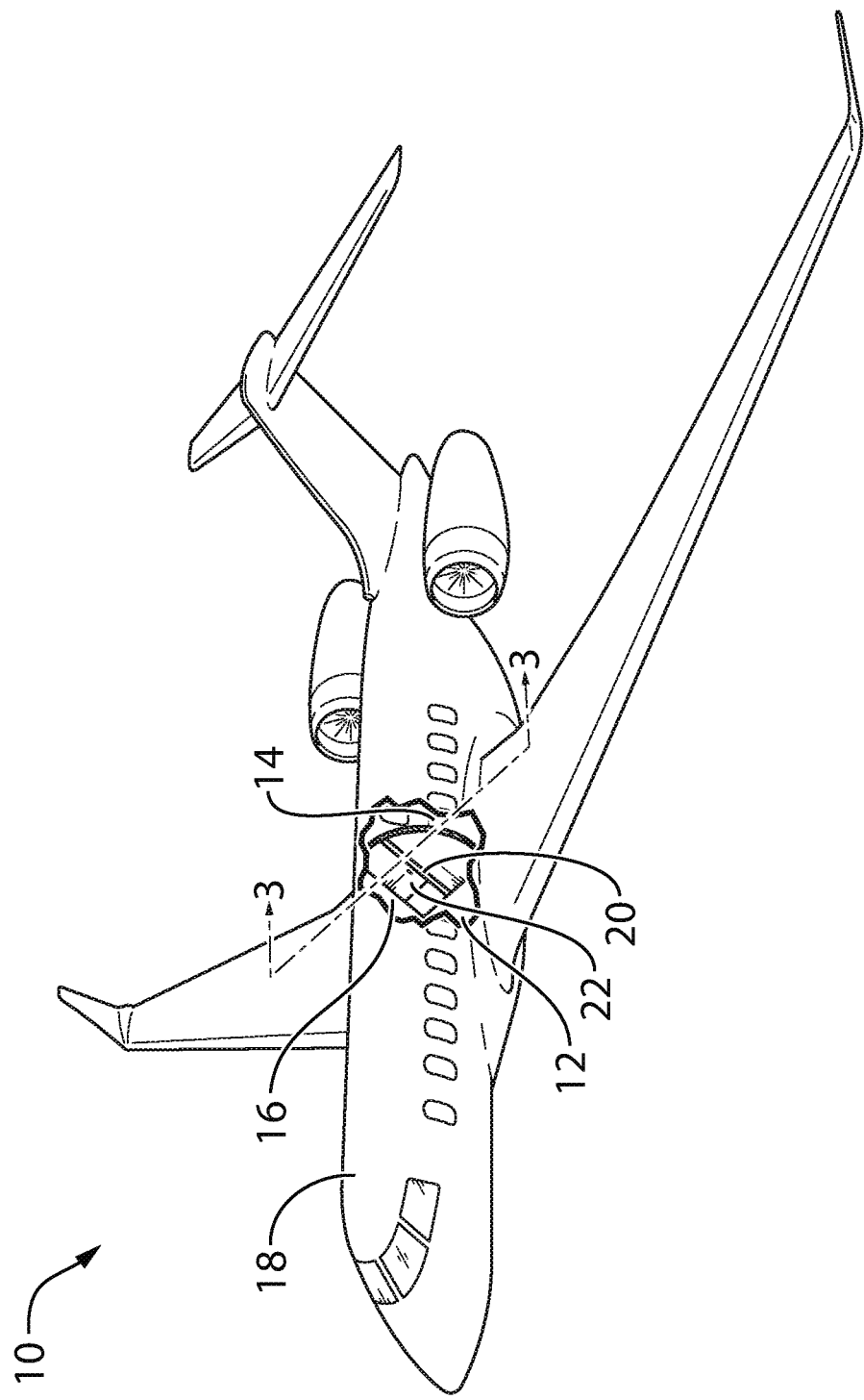
FIG. 1 is an axonometric view of an exemplary aircraft with a cut-away portion showing a bulkhead separating adjacent zones of the aircraft's interior.

FIG. 1 illustrates an exemplary aircraft, generally shown at 10, comprising an aircraft interior such as a passenger cabin, which may have one or more zones therein and which may be pressurized and potentially be occupied by passengers during flight. Aircraft 10 may include, for example, any suitable aircraft such as corporate, private, commercial or any other type of aircraft. For example, aircraft 10 may be a narrow-body, twin engine jet airliner.

The aircraft interior may have first zone 12 and second zone 14. First zone 12 and second zone 14 may be adjacent to one another and may be separated by bulkhead 16. Bulkhead 16 may comprise any construction suitable for separating first zone 12 and second zone 14 and may comprise a wall-like construction inside the passenger cabin of aircraft 10 for dividing the passenger cabin and thereby defining zones 12 and 14. Bulkhead 16 may be oriented substantially transversely to a central axis of fuselage 18 of aircraft 10.

Bulkhead 16 may define one or more apertures 20. Aperture 20 may include one or more passages through which occupants may pass through and move between zones 12, 14. Alternatively, aperture 20 may, for example, include one or more openings that may not necessarily be configured or intended for occupant traffic. Door 22 may be movable to open and close aperture 20. Door 22 may comprise any conventional or other type of barrier suitable for opening and closing aperture 20. For example, door 22 may comprise any suitable type of sliding and/or swinging barrier such has a hinged door or a pocket door. In various embodiments disclosed herein, door 22 may comprise a pocket-type door.

Figure 2:
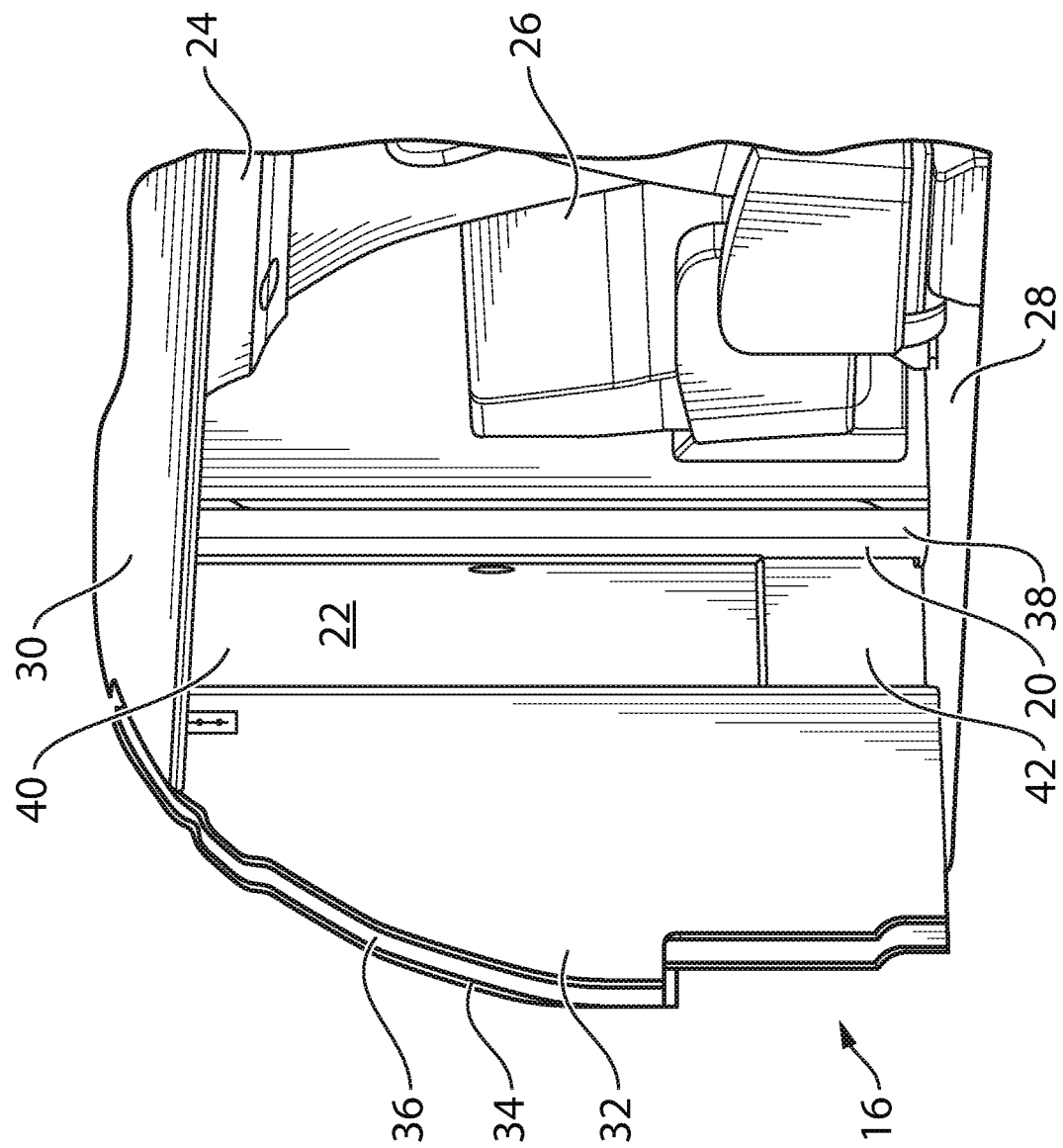
FIG. 2 is an axonometric view of the bulkhead of FIG. 1 with a door partially recessed into a cavity inside the bulkhead.

FIG. 2 shows an exemplary representation of a portion of the interior of aircraft 10, where the aircraft interior includes bulkhead 16 where door 22 is shown to be partially extending across aperture 20 defined in bulkhead 16. The aircraft interior may further include baggage compartment 24, furnishings 26, floor 28 and ceiling 30. Only portions of floor 28 and ceiling 30 are shown for illustration purpose in FIG. 2. Ceiling 30 may follow a generally cylindrical profile conforming at least in part to the shape of fuselage 18. Bulkhead 16 may comprise first decorative member 32 and second decorative member 34 defining internal cavity 36 therebetween. First and second decorative members 32, 34 may each comprise a façade panel. First and second decorative members 32, 34 may serve a mainly decorative (as opposed to a structural) function for finishing the interior of aircraft 10. However, in various embodiments, one or more of decorative members 32, 34 may not necessarily have significant ornamental properties but may simply serve to at least partially cover the contents of cavity 36 of bulkhead 16. Accordingly, in some embodiments, first and second decorative members 32, 34 may not provide any significant structural support for door 22. As described further below, bulkhead 16 may also comprise one or more structural elements that provide structural support for door 22 and to which decorative members 32, 34 may be attached.

Door 22, may, for example, include a sliding pocket door configured to substantially extend across aperture 20 when in a closed position and be substantially recessed (e.g. stowed) in internal cavity 36 of bulkhead 16 when in an open position. Door 22, may extend to and abut against opposing side 38 of aperture 20 when in the open position. Accordingly, door 22 may be used to open and close aperture 20 by being moved laterally in and out of aperture 20 during opening and closing of door 22. Door 22 may comprise main portion 40 and footer 42. When door 22 is opened by sliding into cavity 36, main portion 40 may move laterally as well as vertically downward to compensate for the circular cross-sectional shape of fuselage 18. Footer 42 may be moved laterally by the same amount as main portion 40 while being received inside of main portion 40 as main portion 40 is moving downwardly. Accordingly, main portion 40 may comprise an internal cavity (not shown) that is configured to receive footer 42 as main portion 40 moves downwardly during opening of door 22.

Figure 3:
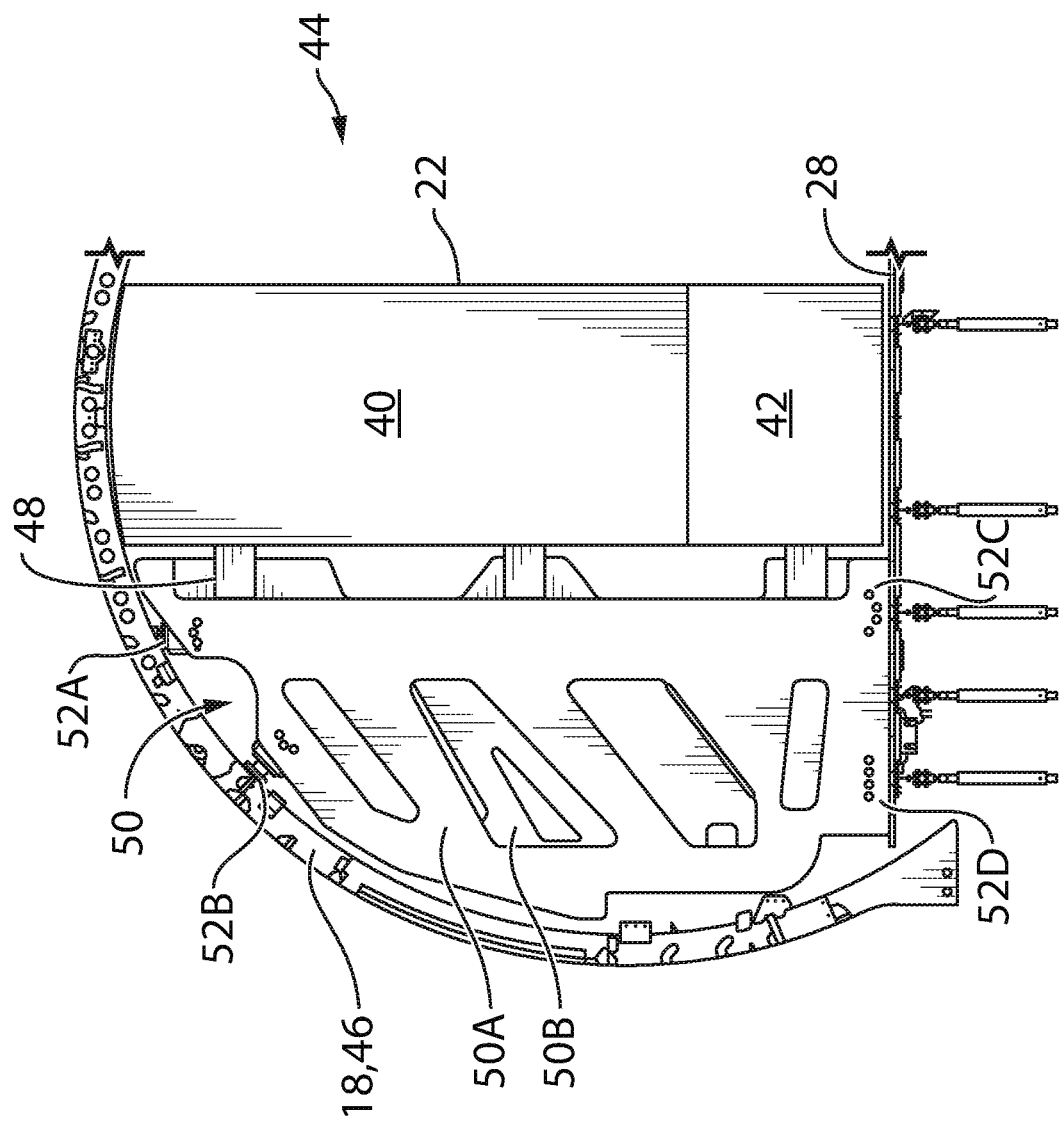
FIG. 3 is a cross-sectional view taken along line 3-3 of FIG. 1 showing an exemplary assembly part of the bulkhead of FIG. 1.

FIG. 3 is a partial cross-sectional view taken along line 3-3 of FIG. 1 showing an exemplary assembly 44, which may form part of bulkhead 16, in relation to frames 46 of fuselage 18 and floor 28. Assembly 44 may comprise pocket door mechanism 48 (shown only schematically in FIG. 3) for supporting and guiding the movement of pocket door 22 and structural member 50 to which pocket door mechanism 48 may be attached. Structural member 50 may be attached directly or indirectly to one or more frames 46, one or more stringers 62 (shown in FIG. 7A), floor 28 or any other suitable structure of aircraft 10. Structural member 50 may be disposed inside cavity 36 (shown in FIG. 2) and be at least partially covered by one or more decorative members 32, 34 (shown in FIG. 2). For example, decorative member 32 may at least partially cover a first side (e.g., facing zone 12 of aircraft interior) of structural member 50 and decorative member 34 may at least partially cover a second side (e.g., facing zone 14 of aircraft interior) of structural member 50 to at least partially keep structural member 50 from sight. In some embodiments, decorative members 32, 34 and/or other decorative members may substantially conceal the entirety of structural member 50. As explained above, decorative members 32, 34 may not provide any significant structural support for door 22. However, structural member 50 may primarily serve a structural function and provide adequate structural support for door 22 by establishing a structural connection (e.g., load path) between door 22 and suitable aircraft structure. In other words, structural member 50 may provide support for door 22 relative to the aircraft structure independently of decorative members 32, 34. In some embodiments, structural member 50 may provide adequate structural support for door 22 independently of any other decorative member(s) at least partially covering structural member 50. In various embodiments, door 22 may optionally be considered part of assembly 44 as referenced herein.

Structural member 50 may be attached to aircraft structure at one or more connections. The number, location and type of connections between structural member 50 and aircraft structure may be selected to permit some relative movement between the aircraft structure and structural member 50. For example, one or more of the connections may be configured to limit an amount of deformation of structural member 50 due to the torsion of fuselage 18. Accordingly, the connections may help in preventing door 22 from becoming jammed under flight load. For example, structural member 50 may be directly or indirectly attached to one or more frames 46 (sometimes referred as "ribs") of fuselage 18 via connections 52A and 52B. Structural member 50 may also be directly or indirectly attached to floor 28 via connections 52C and 52D. One or more of connections 52A-52D may be configured to permit positional adjustment of structural member 50 relative to its/their corresponding aircraft structure. One or more of connections 52A-52D may, to some extent, be compliant and have the ability to absorb some amount of relative displacement between aircraft structure (e.g., fuselage 18, floor 28) and structural member 50. For example, in some embodiments, one or more of connections 52A-52D may comprise an eccentric bushing that may allow for positional adjustment. Alternatively or in addition, one or more of connections 52A-52D may comprise a vibration absorber. Connections 52A-52D may be of known or other suitable types. For example, the type of connections 52A-52D may be selected to permit the installation of structural member 50 at different locations inside aircraft 10 and thereby facilitate floor plan reconfigurations inside aircraft 10 if required.

Figure 4:
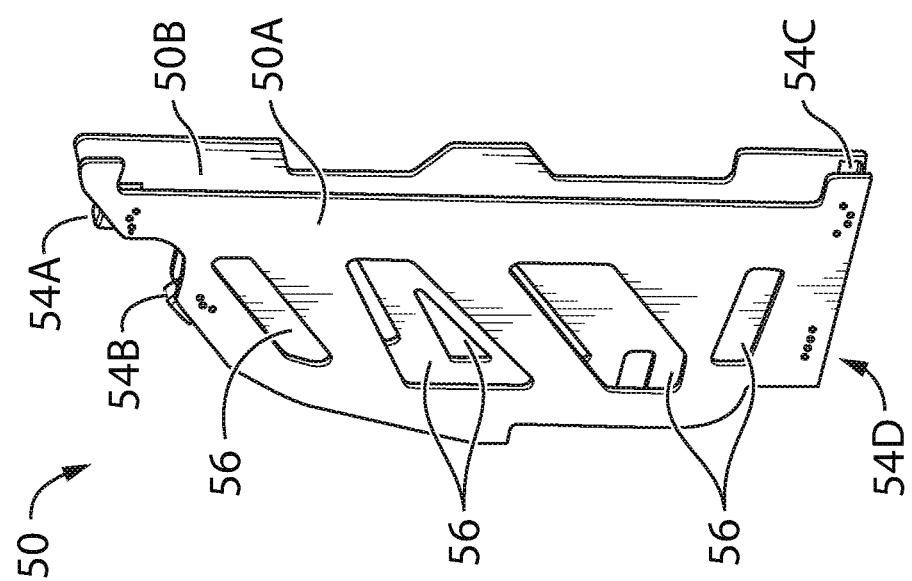
FIG. 4 is an axonometric view of an exemplary structural member of the assembly of FIG. 3.

FIG. 4 is an axonometric view of structural member 50 of assembly 44. In various embodiments, structural member 50 may have a different configuration than that illustrated in the figures and may comprise any structure suitable for providing structural support for door 22 by providing a load path between door 22 and aircraft structure. In some embodiments structural member 50 may have additional functions such as providing structural support for decorative members 32, 34. In various embodiments, structural member 50 may comprise a cage-like structure that at least partially encloses door mechanism 48. Such cage-like structure may comprise one or more parts such as panels, wires, bars, plates, beams or combinations thereof forming a structural arrangement. For example, such cage-like structure may be in the form of a box like or other type of enclosure. In some embodiments, structural member 50 may be configured to at least partially receive pocket door 22 therein when pocket door 22 is in an open position. In the exemplary embodiment shown in FIG. 4, structural member 50 may comprise first panel 50A and second panel 50B spaced apart from first panel 50A. The space between first panel 50A and second panel 50B may receive door mechanism 48 and also door 22 when door 22 is in the open (i.e., stowed) position. In some embodiments, structural member 50 may comprise only one of panels 50A, 50B.

First and/or second panels 50A, 50B and/or any other part(s) forming structural member 50 may comprise any structural material(s) suitable for aircraft applications such as, for example, composite material(s) including carbon fibre and/or aluminum-based or other alloy(s). First panel 50A and second panel 50B may be substantially parallel to each other. First panel 50A and second panel 50B may be attached together via one or more suitable brackets 54A-

54D. In some embodiments, one of more of brackets 54A-54D may each comprise a metallic C-shaped channel. First panel 50A and second panel 50B may be attached to brackets 54A-54D via fasteners such as one or more rivets or suitable threaded fasteners. The respective locations of one or more of brackets 54A-54D may correspond to the respective locations of one or more of connections 52A-52D shown in FIG. 3 so that the attachment of structural member 50 to aircraft structure may be established via one or more of brackets 54A-54D. One or more of brackets 54A-54D may have a different configuration than shown herein depending on whether structural member 50 comprises one or both of panels 50A and 50B and also whether structural member 50 comprises one or more parts other than panels 50A and 50B.

In some embodiments, one or both of panels 50A and 50B may comprise holes 56 therein. Holes 56 may provide access to the space between first and second panels 50A, 50B and may facilitate installation of assembly 44 in aircraft 10 and also facilitate maintenance procedures. Holes 56 may also be considered lightening holes formed to reduce the weight of panels 50A, 50B while still preserving an adequate amount of structural integrity for panels 50A, 50B.

As explained in more detail below, one or more of decorative members 32, 34 may be attached directly or indirectly to structural member 50. Accordingly, structural member 50 may also provide structural support for decorative members 32, 34. For example, first decorative member 32 may be attached to first panel 50A of structural member 50 via one or more suitable fastening means. Similarly, second decorative member 34 may be attached to second panel 50B of structural member 50 via one or more suitable fastening means.

Figure 5:
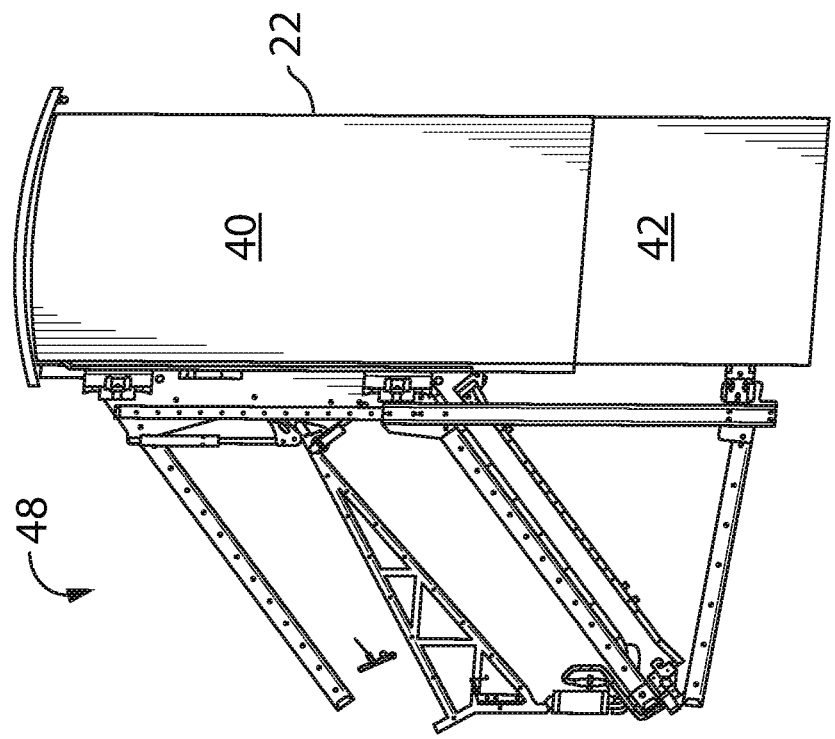
FIG. 5 is a front elevation view of the door of FIG. 2 with an exemplary associated door mechanism.

FIG. 5 is a front elevation view of pocket door 22 with associated pocket door mechanism 48. Door mechanism 48 may be configured to support and guide the movement of pocket door 22. Door mechanism 48 may comprise any suitable pocket door mechanism and may not necessarily be as illustrated herein. In some embodiments, door mechanisms as disclosed in International Patent Publication No. WO 2014/027,215 A1, which is incorporated herein in its entirety, may be suitable.

Figure 6:
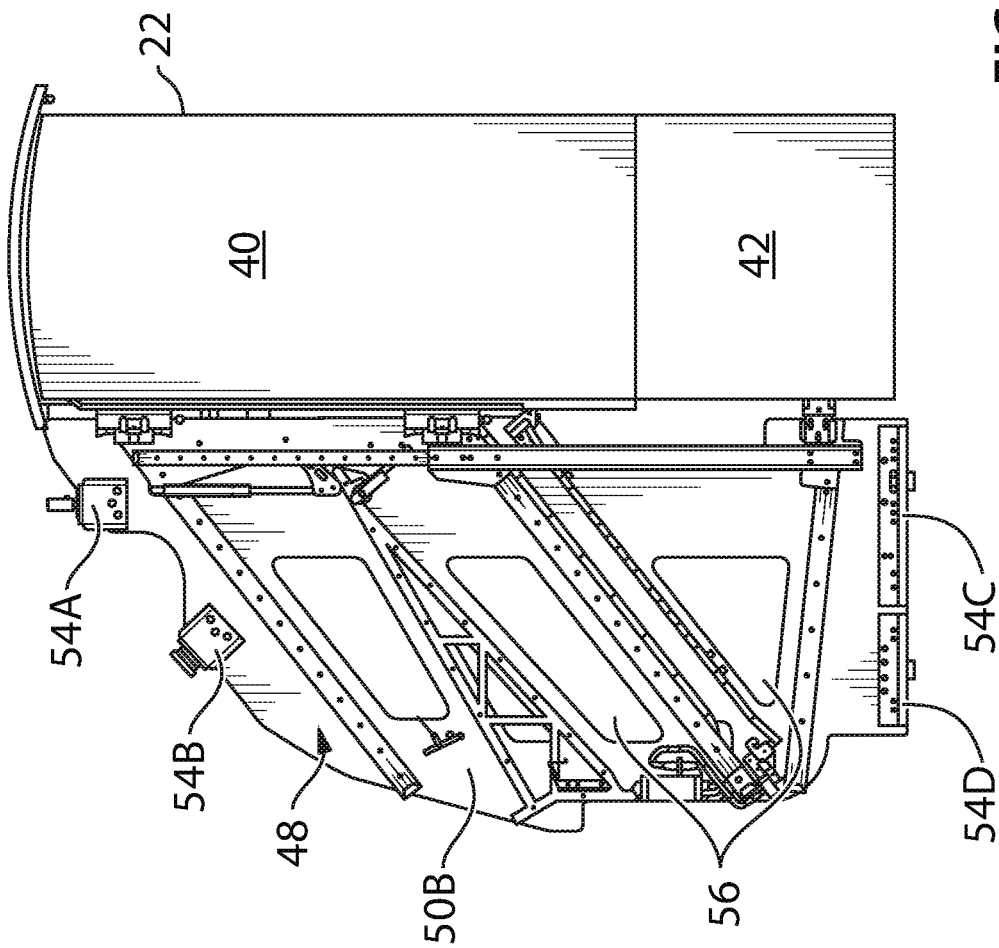
FIG. 6 is a front elevation view of the door and mechanism of FIG. 5 attached to a panel of the structural member of FIG. 4.

FIG. 6 is a front elevation view of door 22 and mechanism 48 where mechanism 48 is attached to second panel 50B of structural member 50. In some embodiments, the entirety of mechanism 48 may be attached to only one of first panel 50A and second panel 50B. This may facilitate the installation of mechanism 48 to structural member 50. This may also facilitate the adjustment of mechanism 48 relative to structural member 50. For example, it may be desirable to make positional adjustments of door 22 via mechanism 48 and the attachment of the entirety of mechanism 48 to second panel 50B may facilitate such adjustments. Accordingly, in some cases, the installation of first panel 50A may be done subsequently to the attachment of mechanism 48 to second panel 50B and also subsequently to the positional adjustment of door 22 relative to second panel 50B via mechanism 48. In some embodiments, it may also be possible to make positional adjustments of door 22 via mechanism 48 or otherwise after the installation of first panel 50A opposite second panel 50B and also after the installation of structural member 50 in aircraft 10. Alternatively, only second panel 50B may serve as structural member 50 and first panel 50A may not be required. In such embodiment, one or both of decorative members 32, 34 may be attached directly to second panel 50B.

Figure 7A:
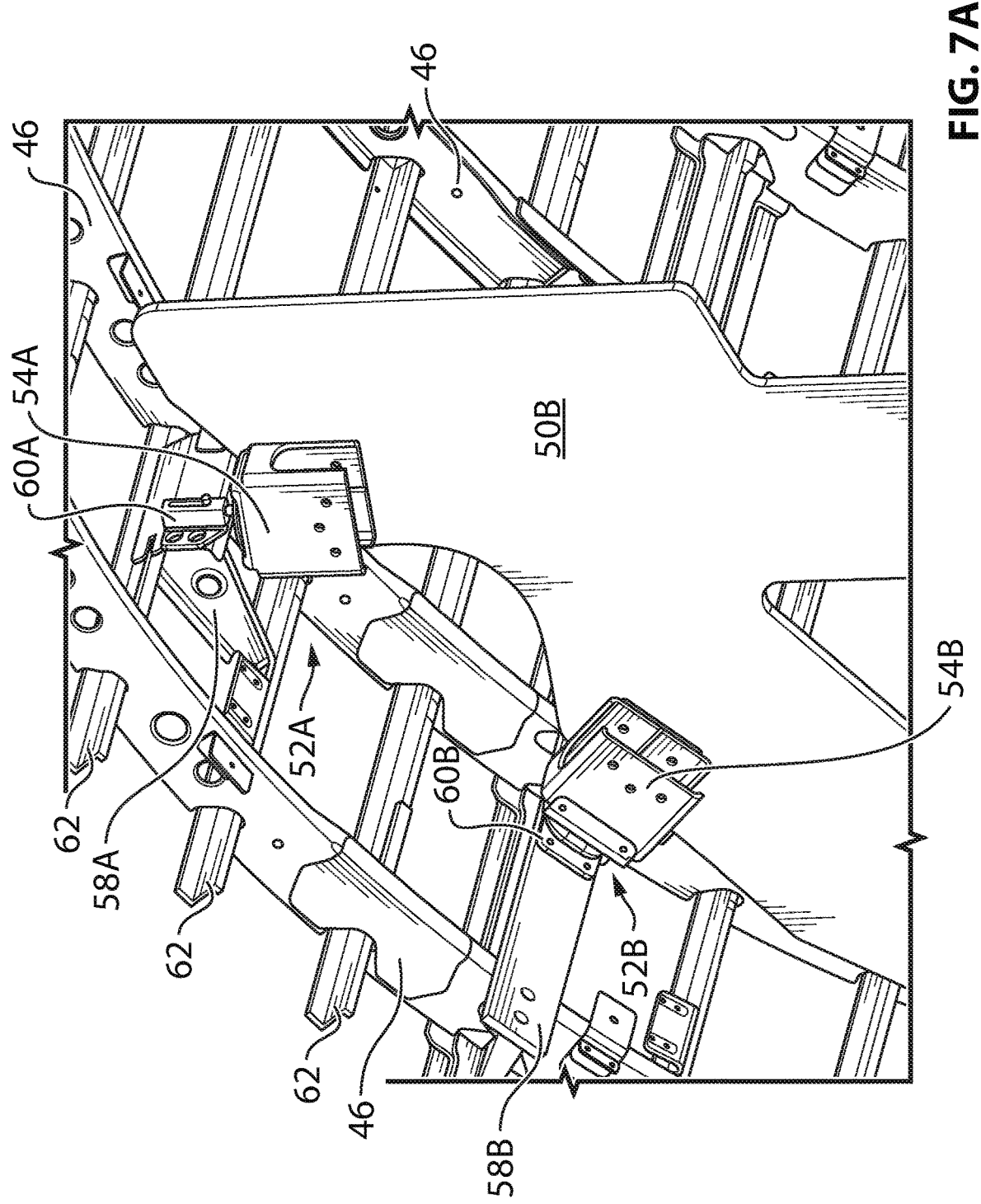
FIG. 7A is an axonometric view of an upper portion of the panel of FIG. 6 attached to a fuselage of the aircraft of FIG. 1.

FIG. 7A is an axonometric view of an upper portion of second panel 50B without door mechanism 48 attached thereto. FIG. 7A shows connections 52A and 52B where structural member 50 is attached to fuselage 18 of aircraft 10. One or more of connections 52A, 52B may be configured to limit an amount of deformation of structural member 50 due to the torsion of fuselage 18. One or more of connections 52A and 52B may be made directly to stringers 62 and/or to frames 46. Alternatively, one or more of connections 52A and 52B may be made at intercostal regions (i.e., between frames 46) depending on the location where structural member 50 is installed relative to frames 46. Connection 52A may be established via bracket 54A, support 58A and intermediate connector 60A. As explained above, bracket 54A may be attached to first and second panels 50A, 50B. Support 58A may be attached to one or more stringers 62, which, in turn may be attached to one or more frames 46 of fuselage 18. Alternatively, support 58A may be attached directly to one or more frames 46. Connector 60A may be configured to provide a structural connection between bracket 54A and support 58A. Connection 52B may be established via bracket 54B, support 58B and intermediate connector 60B. As explained above, bracket 54B may be attached to first and second panels 50A, 50B. Support 58B may be attached to one or more stringers 62, which, in turn may be attached to one or more frames 46 of fuselage 18. Alternatively, support 58B may be attached directly to one or more frames 46. Connector 60B may be configured to provide a structural connection between bracket 54B and support 58B.

Figure 7C:
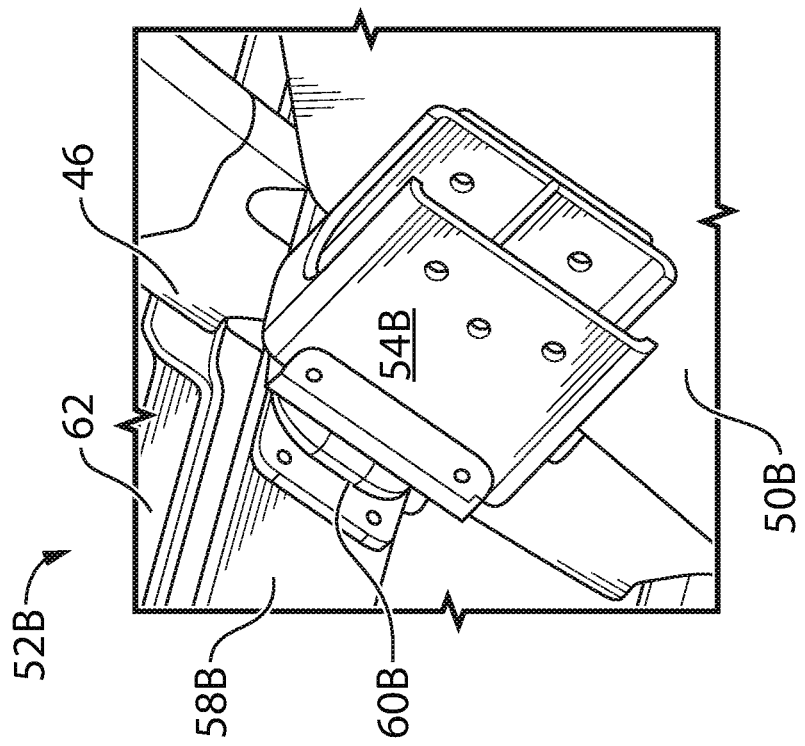
FIG. 7C is an enlarged axonometric view of a second connection between the panel of FIG. 6 and the fuselage of the aircraft of FIG. 1.
Figure 7B:
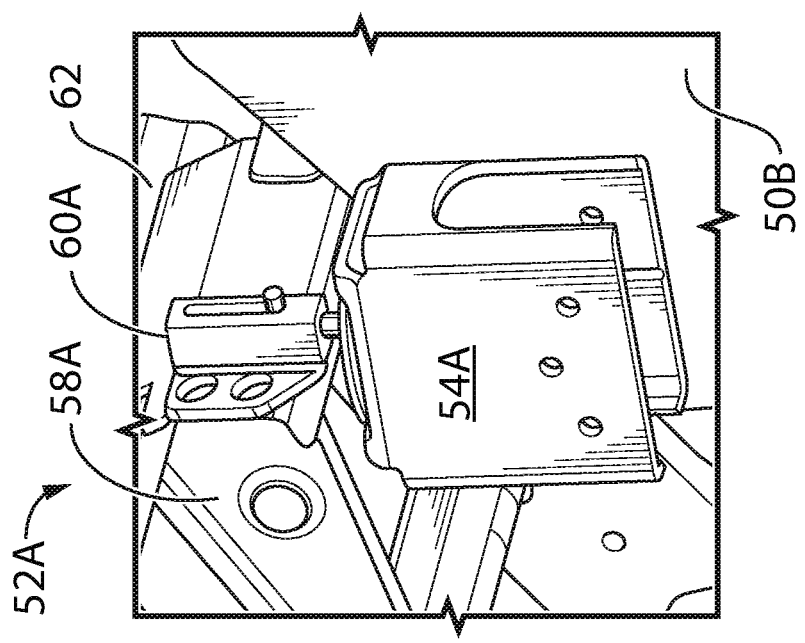
FIG. 7B is an enlarged axonometric view of a first connection between the panel of FIG. 6 and the fuselage of the aircraft of FIG. 1.

FIG. 7B is an enlarged axonometric view of connection 52A between structural member 50 and fuselage 18 of aircraft 10. Connector 60A may be configured to permit positional adjustment of structural member 50 relative to support 58A. Connector 60A may also be configured to resiliently (e.g., non-destructively) absorb some amount of relative displacement (e.g., vibration) between support 58A and structural member 50.

FIG. 7C is an enlarged axonometric view of connection 52B between structural member 50 and fuselage 18 of aircraft 10. Connector 60B may be configured to permit positional adjustment of structural member 50 relative to support 58B. Connector 60B may also be configured to resiliently (e.g., non-destructively) absorb some amount of relative displacement (e.g., vibration) between support 58B and structural member 50.

FIG. 8A is an axonometric view of a lower portion of second panel 50B. FIG. 8A shows connections 52C and 52D where structural member 50 is attached to floor 28 of aircraft 10. One or more of connections 52C, 52D may be configured to limit an amount of deformation of structural member 50 due to the torsion of fuselage 18. Connection 52C may be established via bracket 54C, support 58C and intermediate connector 60C. Bracket 54C is shown as being partially transparent in FIG. 8A for illustration purpose only. As explained above, bracket 54C may be attached to first and second panels 50A, 50B. Support 58C may be attached to one or more floor tracks 64. Floor tracks 64 may also serve as seat tracks to which seats may be attached. Connector 60C may be configured to provide a structural connection between bracket 54C and support 58C. Connection 52D may be established via bracket 54D, support 58D and intermediate connector 60D. Bracket 54D may be attached to first and second panels 50A, 50B. Support 58D may be attached to one or more floor tracks 64. Connector 60D may be configured to provide a structural connection between bracket 54D and support 58D.

FIG. 8B is an enlarged axonometric view of connection 52C between structural member 50 and fuselage 18 of aircraft 10. Since connections 52C and 52D have similar functions and structures, only an enlarged portion of connection 52C is shown and described. However, in some embodiments connections 52C and 52D could have different functions and structures. Bracket 54C is shown as being partially transparent in FIG. 8B for illustration purpose only. Connector 60C may be configured to permit positional adjustment of structural member 50 relative to support 58C. Connector 60C may also be configured to resiliently (e.g., non-destructively) absorb some amount of relative displacement (e.g., vibration) between support 58C and structural member 50.

Figure 9B:
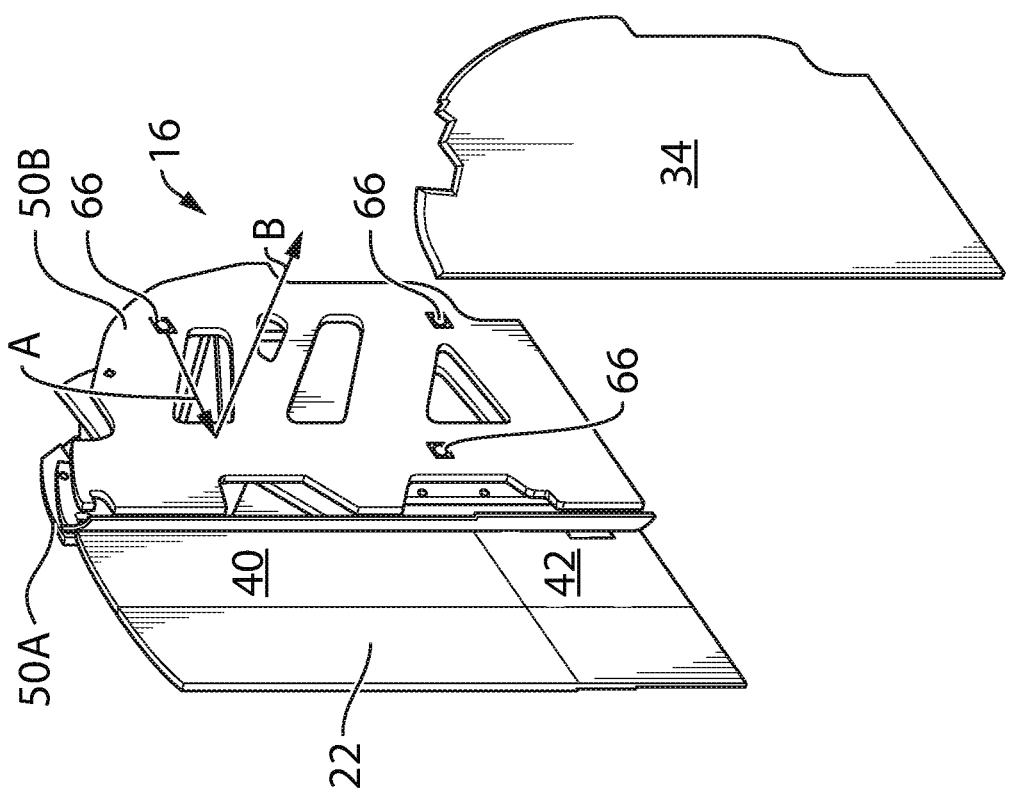
FIGS. 9A and 9B are axonometric views of the bulkhead of FIG. 1 with a decorative member being detached from the structural member of FIG. 4.
Figure 9A:
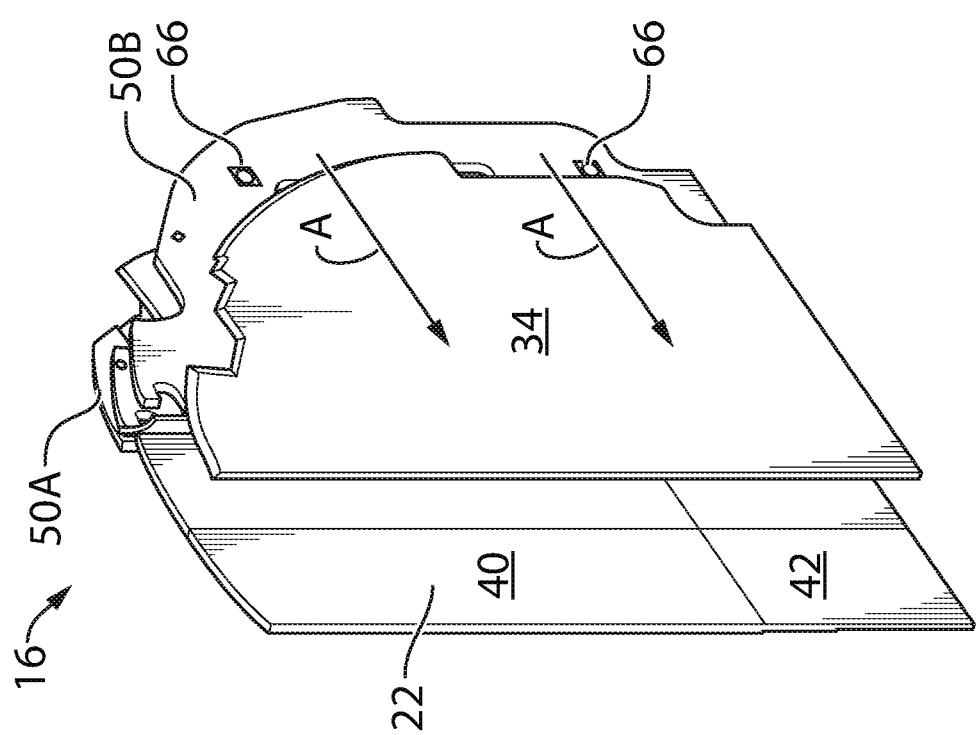

FIGS. 9A and 9B are axonometric views of bulkhead 16 with decorative member 34 being detached from structural member 50. In light of the present disclosure, it should be understood that decorative members 32, 34 may be attached to structural member 50 using any known or other suitable means. For example the attachment of decorative members 32, 34 may be made using fasteners (e.g., threaded fasteners such as screws or bolts), brackets, clips, connectors (e.g., keyhole connectors) and/or combinations thereof. In various embodiments, fastening means used to attach decorative members 32, 34 may permit relatively easy installation and/or removal of decorative members 32, 34 to and from structural member 50 so as to reduce installation time and also permit maintenance personnel to easily gain access to cavity 36 (shown in FIG. 2) defined between decorative members 32, 34. Accordingly, the fastening means may permit removable attachment of decorative members 32, 34 to structural member 50.

FIGS. 9A and 9B show two stages of removal of second decorative member 34 from second panel 50B of structural member 50. In the exemplary embodiment shown, the attachment of second decorative member 34 to second panel 50B may be achieved via one or more keyhole connectors in combination with one or more threaded fasteners at one or more attachment points 66. For example, two commonly-oriented keyhole connectors may be used in combination with a threaded fastener. In some embodiments, four commonly-oriented and spaced-apart keyhole connectors may be used in combination with one or more threaded fasteners. The combination of the keyhole connector(s) with the threaded fastener(s) may permit locking second decorative member 34 in place. Such keyhole connectors may comprise counterparts affixed to second panel 50B and second decorative member 34. First decorative member 32 may be removably attached to first panel 50A in a similar manner.

In reference to FIG. 9A, after the removal of the one or more threaded faster, second decorative member 34 may be released for movement in at least one direction and translated along direction A to cause disengagement of the one or more keyhole connectors. In reference to FIG. 9B, once the one or more keyhole connectors have been disengaged, second decorative member 34 may be pulled away from second panel 50B along direction B to complete the removal of second decorative member 34 from second panel 50B. The attachment of second decorative member 34 to second panel 50B may be done by reversing the above procedure to first engage the keyhole connectors and then installing the threaded fastener. First decorative member 32 may be removed from and attached to first panel 50A in a similar manner.

FIG. 10 is a flowchart illustrating a method 100 for installing part of a bulkhead 16 comprising pocket door 22 in a vehicle (e.g., aircraft) interior. As mentioned above, the components, assemblies and methods disclosed herein may facilitate the installation of pocket doors 22 in vehicle interiors. For example, in some embodiments, assembly 44, comprising structural member 50, mechanism 48 and optionally door 22, may be pre-assembled prior to installation in aircraft 10. The use of pre-assembled assembly 44 may facilitate the installation into aircraft 10 and may reduce the overall amount of time and cost required for installation. For example, assembly 44 may be assembled and optionally pre-adjusted at a supplier's facility and subsequently installed into aircraft 10 via connections 52A-52D. For example, positional adjustment of door 22 relative to structural member 50 may also be done prior to installation of assembly 44 into aircraft 10. In some embodiments, coarse adjustment(s) of mechanism 48 and/or door 22 may be done prior to the installation of assembly 44 into aircraft 10 and fine adjustment(s) of mechanisms 48 and/or door 22 may be done during or after installation of assembly 44 into aircraft 10.

Accordingly, method 100 may comprise: attaching pocket door mechanism 48 for pocket door 22 to structural member 50 (see block 102); attaching structural member 50 to aircraft structure (e.g., fuselage 18, floor 28) to provide support for pocket door 22 independently of any decorative member(s) 32, 34 at least partially covering structural member 50 (see block 104); and after attaching structural member 50 to the aircraft structure, covering at least part of structural member 50 with one or more of decorative members 32 and 34 (see block 106). Attaching pocket door mechanism 48 to structural member 50 may comprise attaching pocket door mechanism 48 to one or both of panels 50A, 50B of structural member 50. For example, pocket door mechanism 48 may be attached in its entirety to one of panels 50A, 50B or, alternatively, each of panels 50A, 50B may have one or more parts of pocket door mechanism 48 attached thereto.

In some embodiments, method 100 may also comprise attaching pocket door 22 to pocket door mechanism 48 before attaching structural member 50 to the aircraft structure. Method 100 may also comprise adjusting door mechanism 48 before attaching structural member 50 to the aircraft structure. In various embodiments, the aircraft structure may, for example, include fuselage 18 and/or floor 28 of aircraft 10.

In some embodiments, method 100 may also comprise making adjustments to pocket door mechanism 48 after attaching structural member 50 to the aircraft structure (see block 104), and prior to attaching decorative members 32, 34 to at least partially cover structural member 50 (see block 106).

In some embodiments, method 100 may comprise attaching one or more of decorative members 32, 34 to structural member 50. For example, first decorative member 32 may be attached to first panel 50A and second decorative member 34 may be attached to second panel 50B. Alternatively, where structural member 50 comprises only one of first panel 50A and second panel 50B, first decorative member 32 and second decorative member 34 may be attached to the one of first panel 50A and second panel 50B. In such configuration of structural member 50, first decorative member 32 and second decorative member 34 may be attached to opposite sides of the one of first panel 50A and second panel 50B. The one or more decorative members 32, 34 may be also be detachable from structural member 50 to permit removal therefrom and provide access to cavity 36 (see FIG. 1) inside of bulkhead 16 from one or both sides of bulkhead 16 without disturbing the installation of door 22.

In some embodiment, the methods and assemblies described herein may facilitate the installation of bulkheads and doors in aircraft interiors. For example, the methods and assemblies described herein may permit the installation of other equipment or accessories on and/or from both sides of bulkhead 16 after door 22 has already been installed via structural member 50. Also, since decorative members 32, 34 may be removably attached to structural member 50, decorative members 32, 34 may be removed (e.g., detached) without disturbing door mechanism 48 and/or door 22. The ability to remove decorative members 32, 34 from structural member 50 may also facilitate maintenance activities by not having to remove pocket door 22 in order to gain access to cavity 36.

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, the blocks may be performed in a differing order, or blocks may be added, deleted, or modified. The present disclosure may be embodied in other specific forms without departing from the subject matter of the claims. Also, one skilled in the relevant arts will appreciate that while the components and assemblies disclosed and shown herein may comprise a specific number of elements, the components and assemblies could be modified to include additional or fewer of such elements. The present disclosure is also intended to cover and embrace all suitable changes in technology. Modifications which fall within the scope of the present invention will be apparent to those skilled in the art, in light of a review of this disclosure, and such modifications are intended to fall within the appended claims.

What is claimed is:

1. A bulkhead assembly for an aircraft interior, the bulkhead assembly comprising:
    a pocket door mechanism for supporting and guiding the movement of a pocket door;
    a structural member to which the pocket door mechanism is attached, the structural member attachable to a structure of the aircraft and at least partially covered by a first decorative member, the structural member providing support for the pocket door relative to the aircraft structure independently of the first or any other decorative member, the structural member at least partially enclosing the pocket door mechanism;
    a first set of at least one connector for attachment of the structural member to a fuselage of the aircraft, said first set of at least one connector permitting positional adjustment of the structural member relative to the fuselage and limiting deformation of the structural member due to torsion of the fuselage; and
    a second set of at least one connector for attachment of the structural member to a floor of the aircraft interior, said second set of at least one connector having compliance to absorb relative displacement between the structural member and the floor, and limiting deformation of the structural member due to torsion of the fuselage,
    wherein each decorative member comprises a façade panel removably attachable to the structural member and each decorative member is shaped to substantially conceal an entirety of the structural member.

2. The bulkhead assembly as defined in claim 1, wherein the structural member comprises a cage structure at least partially enclosing the pocket door mechanism.

3. The bulkhead assembly as defined in claim 1, wherein the structural member is configured to at least partially receive the pocket door when the pocket door is in an open position.

4. The bulkhead assembly as defined in claim 1, wherein the structural member comprises a first structural member panel and a second structural member panel spaced apart from the first structural member panel.

5. The bulkhead assembly as defined in claim 4, wherein the pocket door mechanism is disposed between the first structural member panel and the second structural member panel.

6. The bulkhead assembly as defined in claim 4, wherein the first structural member panel and the second structural member panel are attached together via a bracket.

7. The bulkhead assembly as defined in claim 6, wherein the structural member is attached to the aircraft structure via the bracket.

8. The bulkhead assembly as defined in claim 4, wherein the first decorative member is attached to the first structural member panel and a second decorative member is attached to the second structural member panel.

9. The bulkhead assembly as defined in claim 4, wherein the first structural member panel and the second structural member panel are substantially parallel.

10. The bulkhead assembly as defined in claim 4, wherein the pocket door mechanism is entirely attached to only one of the first structural member panel and the second structural member panel.

11. The bulkhead assembly as defined in claim 2, wherein the cage structure comprises a boxlike enclosure.

12. The bulkhead assembly as defined in claim 2, wherein the cage structure comprises a first structural member panel.

13. The bulkhead assembly as defined in claim 12, wherein the cage structure comprises a second structural member panel spaced apart from the first structural member panel.

14. An assembly for a bulkhead comprising a pocket door in a vehicle interior, the assembly comprising:
    a pocket door mechanism for supporting and guiding the movement of the pocket door;
    a structural member to which the pocket door mechanism is attached, the structural member attachable to a structure of the vehicle, the structural member at least partially covered by a first decorative member and the structural member providing support for the pocket door relative to the vehicle structure independently of the first or any other decorative member, the structural member at least partially enclosing the pocket door mechanism;
    a first set of at least one connector for attachment of the structural member to a fuselage of the vehicle, said first connection permitting positional adjustment of the structural member relative to the fuselage and limiting deformation of the structural member due to torsion of the fuselage; and
    a second set of at least one connector for attachment of the structural member to a floor of the vehicle interior, said second connection having compliance to absorb relative displacement between the structural member and the floor, and limiting deformation of the structural member due to torsion of the fuselage,
    wherein each decorative member comprises a façade panel removably attachable to the structural member and each decorative member is shaped to substantially conceal an entirety of the structural member.

15. The assembly as defined in claim 14, wherein the structural member comprises a cage structure at least partially enclosing the pocket door mechanism.

16. A method for installing part of a bulkhead comprising a pocket door in a vehicle interior, the method comprising:
attaching a pocket door mechanism for the pocket door to a structural member;
attaching the structural member to a structure of the vehicle to provide support for the pocket door independently of any decorative member at least partially covering the structural member;
adjusting a position of the structural member with respect to the structure of the vehicle; and
after attaching the structural member to the structure of the vehicle, covering at least part of the structural member with the decorative member,
wherein each decorative member comprises a façade panel removably attachable to the structural member and each decorative member is shaped to substantially conceal an entirety of the structural member, wherein the attaching of the structural member is done through a first set of at least one connector permitting positional adjustment of the structural member relative to the fuselage and a second set of at least one connector to a floor of the vehicle interior, said second set of at least one connector having compliance to absorb relative displacement between the structural member and the floor, said first and second sets of at least one connector are configured to limit deformation of the structural member due to torsion of the vehicle interior.

17. The method for installing part of a bulkhead as defined in claim 16, comprising attaching the pocket door to the pocket door mechanism before attaching the structural member to the structure of the vehicle.

* * * * *